United States Patent Office 3,240,754
Patented Mar. 15, 1966

3,240,754
POLYMERIC SILANES AND SILOXANES CONTAINING OXETANE GROUPS
Edwin P. Plueddemann, Midland, Mich., assignor to Dow Corning Corporation, Midland, Mich., a corporation of Michigan
No Drawing. Filed July 24, 1963, Ser. No. 297,242
18 Claims. (Cl. 260—46.5)

This invention relates to new and useful polymeric silanes and siloxanes containing oxetane groups.

More particularly, this invention relates to new silanes and siloxanes having the general or unit formula $$O_{\frac{3-a}{2}}\underset{R''_a}{\overset{|}{Si}}\text{---}R\text{---}\underset{H_2C}{\overset{O}{\underset{\diagdown\diagup}{C}}}\text{---}R\text{---}SiO_{\frac{3-a}{2}}$$

wherein R is a divalent radical selected from the group consisting of radicals consisting of carbon and hydrogen atoms and radicals consisting of carbon, hydrogen and oxygen atoms, any oxygen in R being present in the form of a linkage selected from the group consisting of hydroxy, ether and ester linkages, the R group being bonded to the silicon atom via a silicon-carbon bond, R'' is a member selected from the group consisting of the hydrogen atom, hydrocarbon radicals, halogenated hydrocarbon radicals, hydrocarbonoxy radicals and acyloxy radicals, and $a$ is an integer from 0 to 3 inclusive.

This invention also relates to new copolymers consisting essentially of the siloxane units (A)

$$O_{\frac{3-b}{2}}\underset{R''_b}{\overset{|}{Si}}\text{---}R\text{---}\underset{H_2C}{\overset{O}{\underset{\diagdown\diagup}{C}}}\text{---}R\text{---}SiO_{\frac{3-b}{2}} \text{ and } (B) R''_a SiO_{\frac{4-a}{2}}$$

wherein R, R'' and $a$ are as defined above and $b$ is an integer from 0 to 2 inclusive.

The products of this invention can be dissolved in suitable solvents and the solvent solution then used to cast protective coatings of the product on glass, metals, etc. The products of this invention can also be cured by reacting them with oxetane curing catalysts such as boron trifluoride or other Lewis acids to form cured moldings, castings and films. Numerous other uses of the products of this inevntion will be obvious to those skilled in the art.

The silanes and siloxanes of this invention can be prepared by various methods. For example, when R is a divalent radical consisting of carbon and hydrogen atoms, the compounds can be prepared by the reaction of a silane or siloxane containing silicon-bonded hydrogen atoms and a diolefinic oxetane. This reaction can be illustrated by the following equation:

(1)

$$O_{\frac{3-a}{2}}\underset{R''_a}{\overset{|}{Si}}H + CH_2=CH\text{---}\underset{CH_2\diagup\diagdown CH_2}{\overset{O}{C}}\text{---}CH=CH_2 \xrightarrow{Pt}$$

$$O_{\frac{3-a}{2}}\underset{R''_a}{\overset{|}{Si}}CH_2CH_2\text{---}\underset{CH_2\diagup\diagdown CH_2}{\overset{O}{C}}\text{---}CH_2CH_2\underset{R''_a}{\overset{|}{Si}}O_{\frac{3-a}{2}}$$

In the formulae in Equation 1, R'' and $a$ have the above defined meanings. It is preferred that the reaction be carried out in the presence of a platinum catalyst (for example, in the form of chloroplatinic acid) although the reaction can be carried out by simply heating the two reactants.

Diolefinic oxetanes such as employed in Equation 1 above can be prepared employing the series of reactions illustrated by the following equations:

(2)

$$CH_2=CH(CH_2)_nCl + H_2C(COOR')_2 \xrightarrow{Na}$$
$$[CH_2=CH(CH_2)_n]_2C(COOR')_2$$

Conditions for the above reaction are the same as those employed in a standard malonic ester synthesis.

(2a)

$$[CH_2=CH(CH_2)_n]_2C(COOR')_2 \xrightarrow[\text{distill}]{\text{heat and}}$$
$$[CH_2=CH(CH_2)_n]_2\overset{H}{\underset{|}{C}}COOR'$$

(2b)

$$[CH_2=CH(CH_2)_n]_2\overset{H}{\underset{|}{C}}COOR' + NaOH \longrightarrow$$
$$[CH_2=CH(CH_2)_n]_2\overset{H}{\underset{|}{C}}COONa$$

(2c)

$$[CH_2=CH(CH_2)_n]_2\overset{H}{\underset{|}{C}}COONa + H_2CO \text{ (gaseous)} \xrightarrow{200-300°C}$$
$$[CH_2=CH(CH_2)_n]_2\overset{H}{\underset{|}{C}}CHO$$

(2d)

$$[CH_2=CH(CH_2)_n]_2\overset{H}{\underset{|}{C}}CHO + H_2CO \text{ (aqueous)} \xrightarrow[\text{mild conditions}]{\text{alkali (NaOH)}}$$
$$[CH_2=CH(CH_2)_n]_2C(CH_2OH)_2$$

(2e)

$$[CH_2=CH(CH_2)_n]_2C(CH_2OH)_2 + H_2SO_4 \longrightarrow$$
$$[CH_2=CH(CH_2)_n]_2C(CH_2OH)CH_2OSO_3H$$

(2f)

$$[CH_2=CH(CH_2)_n]_2C(CH_2OH)CH_2OSO_3H + \text{excess aq. NaOH} \longrightarrow$$
$$[CH_2=CH(CH_2)_n]_2C\underset{CH_2\diagdown\diagup CH_2}{\overset{O}{\diagup\diagdown}}$$

In the formulae in the above equations, $n$ is zero or an integer and R' is an alkyl group.

When R is a divalent radical consisting of carbon, hydrogen and oxygen atoms, the silanes and siloxanes of the inevntion can be prepared, for example, by one of the reactions illustrated by the following equations:

(3)

$$O_{\frac{3-a}{2}}\underset{R''_a}{\overset{|}{Si}}(CH_2)_mCl + (NaOCH_2)_2C\underset{CH_2\diagdown\diagup CH_2}{\overset{O}{\diagup\diagdown}} \longrightarrow O_{\frac{3-a}{2}}\underset{R''_a}{\overset{|}{Si}}(CH_2)_mOCH_2\text{---}\underset{CH_2\diagdown\diagup CH_2}{\overset{O}{C}}\text{---}CH_2O(CH_2)_m\underset{R''_a}{\overset{|}{Si}}O_{\frac{3-a}{2}}$$

(4) 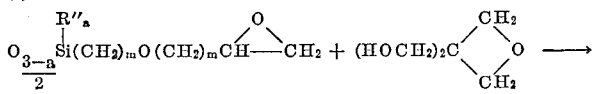

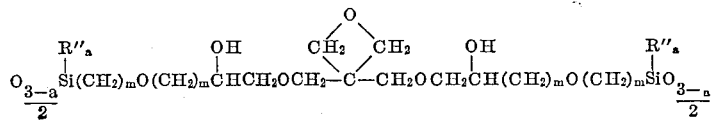

(5) 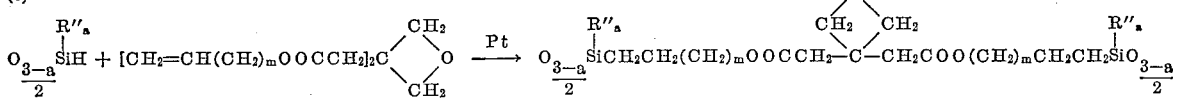

In the formulae in Equations 3, 4 and 5, R″ and $a$ have the above defined meanings and $m$ is an integer.

In Equation 3, the alkoxides employed can be prepared by the reaction of sodium (or other metal) with the corresponding hydroxides which are well-known compounds. This reaction can be illustrated by the equation:

(3a) 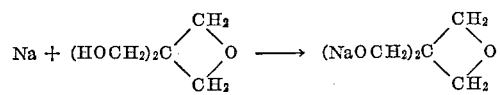

In Equation 5, the unsaturated esters employed can be prepared by the reaction of salts of carboxylated oxetanes with unsaturated halides both of which are well-known compounds. This reaction can be illustrated by the equation:

(5a) 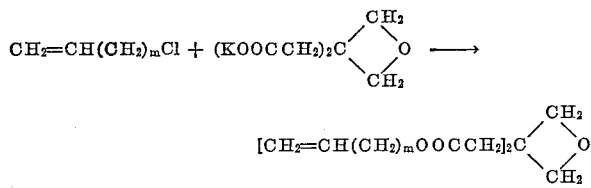

The copolymers of this invention can be prepared employing conventional techniques such as cohydrolysis and condensation of the appropriate silanes or equilibration of a mixture of the appropriate siloxanes.

In order that those skilled in the art can better understand how the present invention can be practiced, the following examples are given by way of illustration and not by way of limitation.

*Example 1*

About 100 ml. of toluene and 9.2 g. of sodium metal were placed in a 500 ml. flask equipped with stirrer, thermometer, condenser and dropping funnel. Then 23.3 g. of allyl alcohol was added to the flask and the mixture heated to about 90–100° C. The sodium disappeared and the contents of the pot became milky. Another 5 ml. of allyl alcohol was added near the end of the reaction (after about 2 hours). A nitrogen sweep was used during the reaction. The solution was then allowed to cool.

31 g. of 3,3-bis(chloromethyl)oxetane,

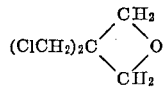

and about 100 ml. of toluene were placed in a 500 ml. flask equipped as above. Then the sodium allyloxide, $NaOCH_2CH=CH_2$, solution prepared above was added and the mixture heated at about 80° C. with stirring. The mixture was allowed to cool overnight. The mixture was then filtered to remove the solids, more allyl alcohol added to the filtrate, and then the filtrate heated at reflux for about 8 hours. The solution was allowed to cool and then filtered again and then the filtrate distilled. About 11.9 g. of a 50–50 mixture of 3-allyloxymethyl-3-chloromethyloxetane,

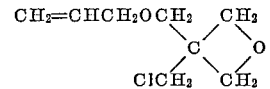

and 3,3-bis(allyloxymethyl)oxetane,

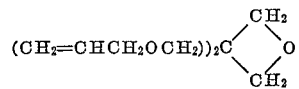

was obtained over a temperature range of 96–108° C. at 10 mm. of pressure. This mixture was then separated into the two individual components employing a gas-liquid chromatographic column.

*Example 2*

0.9 g. of the 3,3-bis(allyloxymethyl)oxetane prepared in Example 1 above was placed in a small vial and a trace of platinum (as chloroplatinic acid) added. This mixture was heated in a water bath to about 100° C. and then 0.6 g. of 1,1,2,2-tetramethyldisiloxane,

$$H(CH_3)_2SiOSi(CH_3)_2H$$

was added dropwise with stirring. The reaction was quite exothermic. The product was a viscous light yellow polymer having the unit formula

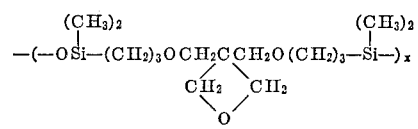

*Example 3*

A trace of boron trifluoride etherate was added to about one-third of the product of Example 2. The material rapidly crosslinked to give a solid insoluble mass.

*Example 4*

When the silanes or siloxanes and oxetanes below are reacted in the presence of a platinum catalyst, the indicated products are obtained. Hydrolysis and condensation of the products containing hydrolyzable groups yields the corresponding siloxanes.

| Silane or Siloxane | Oxetane | Product |
|---|---|---|
| $(C_6H_{11})(CH_3O)_2SiH$ | $(CH_2=CHCH_2OCH_2)_2C\overset{CH_2}{\underset{CH_2}{<}}O$ | $[(C_6H_{11})(CH_3O)_2Si(CH_2)_3OCH_2]_2C\overset{CH_2}{\underset{CH_2}{<}}O$ |
| $(CH_3C_6H_4)(CH_3O)_2SiH$ | $(CH_2=CHCH_2)_2C\overset{CH_2}{\underset{CH_2}{<}}O$ | $[(CH_3C_6H_4)(CH_3O)_2Si(CH_2)_3]_2C\overset{CH_2}{\underset{CH_2}{<}}O$ |
| $(CH_3COO)(CH_3)_2SiH$ | $(CH_2=CHCH_2OCH_2)_2C\overset{CH_2}{\underset{CH_2}{<}}O$ | $[(CH_3COO)(CH_3)_2Si(CH_2)_3OCH_2]_2C\overset{CH_2}{\underset{CH_2}{<}}O$ |
| $(C_6H_5CH_2)(C_2H_5)_2SiH$ | $(CH_2=CHCOOCH_2)_2C\overset{CH_2}{\underset{CH_2}{<}}O$ | $[(C_6H_5CH_2)(C_2H_5)_2SiCH_2CH_2COOCH_2]_2C\overset{CH_2}{\underset{CH_2}{<}}O$ |
| $(CF_3CH_2CH_2)(CH_3)_2SiH$ | $(CH_2=CHCH_2OCH_2)_2C\overset{CH_2}{\underset{CH_2}{<}}O$ | $[(CF_3CH_2CH_2)(CH_3)_2Si(CH_2)_3OCH_2]_2C\overset{CH_2}{\underset{CH_2}{<}}O$ |
| $(CH_3)_2(C_6H_5O)SiH$ | $(CH_2=CHCH_2)_2C\overset{CH_2}{\underset{CH_2}{<}}O$ | $[(CH_3)_2(C_6H_5O)Si(CH_2)_3]_2C\overset{CH_2}{\underset{CH_2}{<}}O$ |
| $(CH_3O)SiH$ | $(CH_2=CHCH_2OCH_2)_2C\overset{CH_2}{\underset{CH_2}{<}}O$ | $[(CH_3O)_3Si(CH_2)_3OCH_2]_2C\overset{CH_2}{\underset{CH_2}{<}}O$ |
| $(Cl_2C_6H_3)(CH_3O)_2SiH$ | $(CH_2=CHCH_2OCH_2)_2C\overset{CH_2}{\underset{CH_2}{<}}O$ | $[(Cl_2C_6H_3)(CH_3O)_2Si(CH_2)_3OCH_2]_2C\overset{CH_2}{\underset{CH_2}{<}}O$ |
| $(CH_3)_3SiH$ | $(CH_2=CHCH_2OCH_2)_2C\overset{CH_2}{\underset{CH_2}{<}}O$ | $[(CH_3)_3Si(CH_2)_3OCH_2]_2C\overset{CH_2}{\underset{CH_2}{<}}O$ |
| $(C_6H_5)(CH_3O)_2SiH$ | $(CH_2=CHCH_2)_2C\overset{CH_2}{\underset{CH_2}{<}}O$ | $[(C_6H_5)(CH_3O)_2Si(CH_2)_3]_2C\overset{CH_2}{\underset{CH_2}{<}}O$ |
| $H(CH_3)_2Si-[-OSi(CH_3)_2-]_y-OSi(CH_3)_2H$ | $(CH_2=CHCH_2OCH_2)_2C\overset{CH_2}{\underset{CH_2}{<}}O$ | $\left\{\begin{array}{l}[-OSi(CH_3)_2-]_y-O\overset{(CH_3)_2}{\underset{\|}{Si}}-(CH_2)_3OCH_2-\overset{\overset{O}{\overset{CH_2 \diagdown CH_2}{\diagup}}}{C}-CH_2O\\ (CH_2)_3-\overset{(CH_3)_2}{\underset{\|}{Si}}-\end{array}\right\}_z$ |

Note.—y and z are integers, i.e. 1, 2, 10, 100, 10,000 etc.

Example 5

When $(CH_3O)_3Si(CH_2)_3OCH_2CH\overset{O}{\overset{\diagdown}{\diagup}}CH_2$ is reacted with 3,3-bis(hydroxymethyl)oxetane, $(HOCH_2)_2C\overset{CH_2}{\underset{CH_2}{<}}O$ in the presence of an alkali metal hydroxide such as potassium hydroxide, a silane having the formula $(CH_3O)_3Si(CH_2)_3OCH_2CH(OH)CH_2OCH_2-\overset{\overset{O}{\overset{CH_2 \diagdown CH_2}{\diagup}}}{C}-CH_2OCH_2CH(OH)CH_2O(CH_2)_3-Si(OCH_3)_3$ is obtained. Hydrolysis and condensation of this silane yields a siloxane having the formula $O_{3/2}Si(CH_2)_3OCH_2CH(OH)CH_2OCH_2-\overset{\overset{O}{\overset{CH_2 \diagdown CH_2}{\diagup}}}{C}-CH_2OCH_2CH(OH)CH_2O(CH_2)_3SiO_{3/2}$

Example 6

When the mixtures of silanes below are hydrolyzed and condensed, copolymers are obtained containing the indicated siloxane units.

| Silane Mixture | Copolymer Units |
|---|---|
| (CH₃)₃SiOCH₃ | (CH₃)₃SiO₁/₂ |
| (CH₃)HSi(OCH₃)₂ | (CH₃)HSiO |
| [(CH₃COO)(CH₃)₂Si(CH₂)₃OCH₂]₂C(CH₂)(CH₂)O (oxetane) | (CH₃)₂  CH₂—CH₂ (oxetane) (CH₃)₂ <br> O₁/₂Si(CH₂)₃OCH₂—C—CH₂O(CH₂)₃SiO₁/₂ |
| CH₃Si(OCH₃)₃ | CH₃SiO₃/₂ |
| (CH₃)₂Si(OCH₃)₂ | (CH₃)₂SiO |
| C₆H₅Si(OCH₃)₃ | C₆H₅SiO₃/₂ |
| [(C₆H₅)(CH₃O)₂Si(CH₂)₃]₂C(CH₂CH₂)O | C₆H₅  CH₂—CH₂  C₆H₅ <br> OSi(CH₂)₃—C—(CH₂)₃SiO |
| (C₂H₅)(CH₃)Si(OC₂H₅)₂ | (C₂H₅)(CH₃)SiO |
| (C₆H₅)(CH₃)Si(OC₂H₅)₂ | (C₆H₅)(CH₃)SiO |
| (C₆H₅)₂(CH₃)SiOCH₃ | (C₆H₅)₂(CH₃)SiO₁/₂ |
| [(C₆H₁₁)(CH₃O)₂Si(CH₂)₃OCH₂]₂C(CH₂CH₂)O | C₆H₁₁  CH₂—CH₂  C₆H₁₁ <br> OSi(CH₂)₃OCH₂—C—CH₂O(CH₂)₃SiO |
| C₁₈H₃₇Si(OCH₃)₃ | C₁₈H₃₇SiO₃/₂ |
| C₃H₇Si(OCH₂OCH₃)₃ | C₃H₇SiO₃/₂ |
| (C₂H₅)₂Si(OC₂H₅)₂ | (C₂H₅)₂SiO |
| [(C₆H₅CH₂)(OCH₃)₂SiCH₂CH₂COOCH₂]₂C(CH₂CH₂)O | CH₂C₆H₅  CH₂—CH₂  CH₂C₆H₅ <br> OSiCH₂CH₂COOCH₂—C—CH₂OOCCH₂CH₂SiO |
| CF₃C₆H₄Si(OCH₃)₃ | CF₃C₆H₄SiO₃/₂ |
| (CF₃CH₂CH₂)(CH₃)Si(OCH₃)₂ | (CF₃CH₂CH₂)(CH₃)SiO |
| (CF₃CH₂CH₂)(CH₃)₂SiOCH₃ | (CF₃CH₂CH₂)(CH₃)₂SiO₁/₂ |
| [(CH₃)₂(C₆H₅O)Si(CH₂)₃]₂C(CH₂CH₂)O | (CH₃)₂  CH₂—CH₂ (CH₃)₂ <br> O₁/₂Si(CH₂)₃—C—(CH₂)₃SiO₁/₂ |
| C₆H₁₁Si(OC₃H₇)₃ | C₆H₁₁SiO₃/₂ |
| (C₆H₅)(CH₂=CH)(CH₃)SiOCH₃ | (C₆H₅)(CH₂=CH)(CH₃)SiO₁/₂ |
| Si(OCH₃)₄ | SiO₂ |
| (C₆H₅)₂Si(OCH₃)₂ | (C₆H₅)₂SiO |
| [(CH₃O)₃Si(CH₂)₃OCH₂]₂C(CH₂CH₂)O | CH₂—CH₂ (oxetane) <br> O₃/₂Si(CH₂)₃OCH₂—C—CH₂O(CH₂)₃SiO₃/₂ |

That which is claimed is:
1. Organosilicon compounds having the general formula

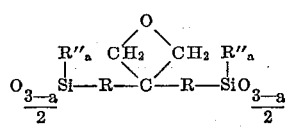

wherein
R is a divalent radical selected from the group consisting of radicals consisting of carbon and hydrogen atoms and radicals consisting of carbon, hydrogen and oxygen atoms, any oxygen in R being present in the form of a linkage selected from the group consisting of hydroxy, ether and ester linkages, the R group being bonded to the silicon atom via a silicon-carbon bond, R″ is a member selected from the group consisting of the hydrogen atom, hydrocarbon radicals, halogenated hydrocarbon radicals, hydrocarbonoxy radicals and acyloxy radicals, and a is an integer from 0 to 3 inclusive.

2. Siloxanes having the general formula

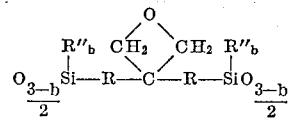

wherein
R is a divalent radical selected from the group consisting of radicals consisting of carbon and hydrogen atoms and radicals consisting of carbon, hydrogen and oxygen atoms, any oxygen in R being present in the form of a linkage selected from the group consisting of hydroxy, ether and ester linkages, the R group being bonded to the silicon atom via a silicon-carbon bond, R″ is a member selected from the group consisting of the hydrogen atom, hydrocarbon radicals, halogenated hydrocarbon radicals, hydrocarbonoxy radicals and acyloxy radicals, and b is an integer from 0 to 2 inclusive.

3. Siloxanes having the general formula

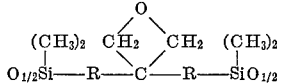

wherein
R is a divalent radical selected from the group consisting of radicals consisting of carbon and hydrogen atoms and radicals consisting of carbon, hydrogen and oxygen atoms, any oxygen in R being present in the form of a linkage selected from the group consisting of hydroxy, ether and ester linkages, the R group being bonded to the silicon atom via a silicon-carbon bond.

4. Siloxanes having the general formula

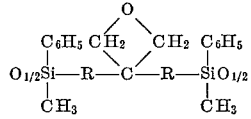

wherein
R is a divalent radical selected from the group consisting of radicals consisting of carbon and hydrogen atoms and radicals consisting of carbon, hydrogen and oxygen atoms, any oxygen in R being present in the form of a linkage selected from the group consisting of hydroxy, ether and ester linkages, the R group being bonded to the silicon atom via a silicon-carbon bond.

5. Siloxanes having the general formula

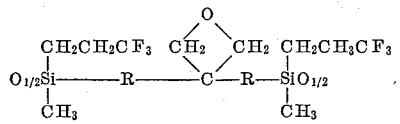

wherein
R is a divalent radical selected from the group consisting of radicals consisting of carbon and hydrogen atoms and radicals consisting of carbon, hydrogen and oxygen atoms, any oxygen in R being present in the form of a linkage selected from the group consisting of hydroxy, ether and ester linkages, the R group being bonded to the silicon atom via a silicon-carbon bond.

6. Copolymers consisting essentially of the siloxane units (A)

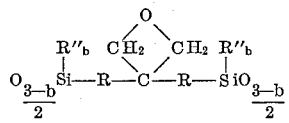

and (B)

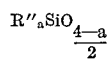

wherein
R is a divalent radical selected from the group consisting of radicals consisting of carbon and hydrogen atoms and radicals consisting of carbon, hydrogen and oxygen atoms, any oxygen in R being present in the form of a linkage selected from the group consisting of hydroxy, ether and ester linkages, the R group being bonded to the silicon atom via a silicon-carbon bond, R″ is a member selected from the group consisting of the hydrogen atoms, hydrocarbon radicals, halogenated hydrocarbon radicals, hydrocarbonoxy radicals and acyloxy radicals, and a is an integer from 0 to 3 inclusive and
b is an integer from 0 to 2 inclusive.

7. Copolymers consisting essentially of the siloxane units (A)

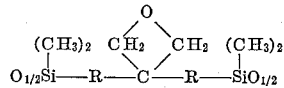

and (B) $(CH_3)_2SiO$ wherein
R is a divalent radical selected from the group consisting of radicals consisting of carbon and hydrogen atoms and radicals consisting of carbon, hydrogen and oxygen atoms, any oxygen in R being present in the form of a linkage selected from the group consisting of hydroxy, ether and ester linkages, the R group being bonded to the silicon atom via a silicon-carbon bond.

8. Copolymers consisting essentially of the siloxane units (A)

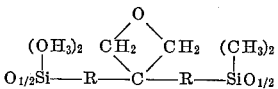

and (B) $(C_6H_5)(CH_3)SiO$, wherein
R is a divalent radical selected from the group consisting of radicals consisting of carbon and hydrogen atoms and radicals consisting of carbon, hydrogen and oxygen atoms, any oxygen in R being present in the form of a linkage selected from the group consisting of hydroxy, ether and ester linkages, the R group being bonded to the silicon atom via a silicon-carbon bond.

9. Copolymers consisting essentially of the siloxane units (A)

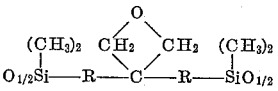

and (B) $(CF_3CH_2CH_2)(CH_3)SiO$, wherein
R is a divalent radical selected from the group consisting of radicals consisting of carbon and hydrogen atoms and radicals consisting of carbon, hydrogen and oxygen atoms, any oxygen in R being present in the form of a linkage selected from the group consisting of hydroxy, ether and ester linkages, the R group being bonded to the silicon atom via a silicon-carbon bond.

10. Copolymers consisting essentially of the siloxane units (A)

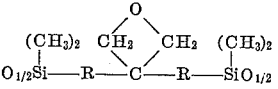

and (B) $H(CH_3)SiO$, wherein
R is a divalent radical selected from the group consisting of radicals consisting of carbon and hydrogen atoms and radicals consisting of carbon, hydrogen and oxygen atoms, any oxygen in R being present in the form of a linkage selected from the group consisting of hydroxy, ether and ester linkages, the R group being bonded to the silicon atom via a silicon-carbon bond.

11. Copolymers consisting essentially of the siloxane units (A)

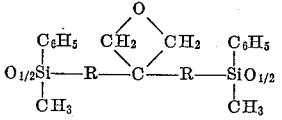

and (B) $(CH_3)_2SiO$, wherein
R is a divalent radical selected from the group consisting of radicals consisting of carbon and hydrogen atoms and radicals consisting of carbon, hydrogen and oxygen atoms, any oxygen in R being present in the form of a linkage selected from the group consisting of hydroxy, ether and ester linkages, the R group being bonded to the silicon atom via a silicon-carbon bond.

12. Copolymers consisting essentially of the siloxane units (A)

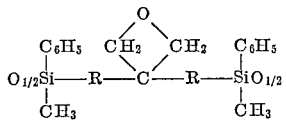

and (B) $(C_6H_5)(CH_3)SiO$, wherein R is a divalent radical selected from the group consisting of radicals consisting of carbon and hydrogen atoms and radicals consisting of carbon, hydrogen and oxygen atoms, any oxygen in R being present in the form of a linkage selected from the group consisting of hydroxy, ether and ester linkages, the R group being bonded to the silicon atom via a silicon-carbon bond.

13. Copolymers consisting essentially of the siloxane units (A)

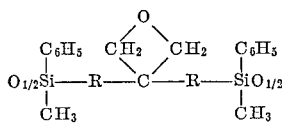

and (B) $(CF_3CH_2CH_2)(CH_3)SiO$, wherein R is a divalent radical selected from the group consisting of radicals consisting of carbon and hydrogen atoms and radicals consisting of carbon, hydrogen and oxygen atoms, any oxygen in R being present in the form of a linkage selected from the group consisting of hydroxy, ether and ester linkages, the R group being bonded to the silicon atom via a silicon-carbon bond.

14. Copolymers consisting essentially of the siloxane units (A)

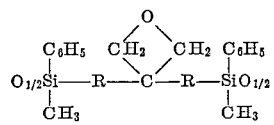

and (B) $H(CH_3)SiO$, wherein R is a divalent radical selected from the group consisting of radicals consisting of carbon and hydrogen atoms and radicals consisting of carbon, hydrogen and oxygen atoms, any oxygen in R being present in the form of a linkage selected from the group consisting of hydroxy, ether and ester linkages, the R group being bonded to the silicon atom via a silicon-carbon bond.

15. Copolymers consisting essentially of the siloxane units (A)

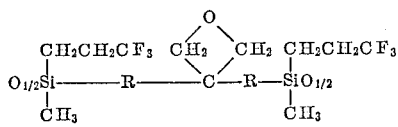

and (B) $(CH_3)_2SiO$, wherein R is a divalent radical selected from the group consisting of radicals consisting of carbon and hydrogen atoms and radicals consisting of carbon, hydrogen and oxygen atoms, any oxygen in R being present in the form of a linkage selected from the group consisting of hydroxy, ether and ester linkages, the R group being bonded to the silicon atom via a silicon-carbon bond.

16. Copolymers consisting essentially of the siloxane units (A)

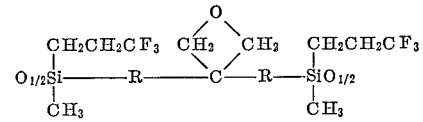

and (B) $(C_6H_5)(CH_3)SiO$ wherein R is a divalent radical selected from the group consisting of radicals consisting of carbon and hydrogen atoms and radicals consisting of carbon, hydrogen and oxygen atoms, any oxygen in R being present in the form of a linkage selected from the group consisting of hydroxy, ether and ester linkages, the R group being bonded to the silicon atom via a silicon-carbon bond.

17. Copolymers consisting essentially of the siloxane units (A)

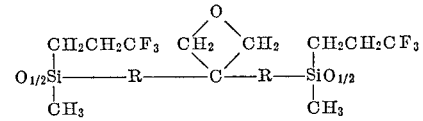

and (B) $(CF_3CH_2CH_2)(CH_3)SiO$, wherein R is a divalent radical selected from the consisting of radicals consisting of carbon and hydrogen atoms and radicals consisting of carbon, hydrogen and oxygen atoms, any oxygen in R being present in the form of a linkage selected from the group consisting of hydroxy, ether and ester linkages, the R group being bonded to the silicon atom via a silicon-carbon bond.

18. Copolymers consisting essentially of the siloxane units (A)

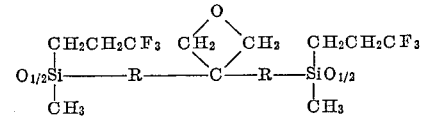

and (B) $H(CH_3)SiO$ wherein R is a divalent radical selected from the group consisting of radicals consisting of carbon and hydrogen atoms and radicals consisting of carbon, hydrogen and oxygen atoms, any oxygen in R being present in the form of a linkage selected from the group consisting of hydroxy, ether and ester linkages, the R group being bonded to the silicon atom via a silicon-carbon bond.

References Cited by the Examiner

Plueddemann et al., Journal American Chemical Society, 81, p. 2632 (1959).

LEON J. BERCOVITZ, *Primary Examiner.*